(12) United States Patent
Kitahara

(10) Patent No.: US 8,644,126 B2
(45) Date of Patent: Feb. 4, 2014

(54) OPTICAL INFORMATION RECORDING MEDIUM AND METHOD FOR MANUFACTURING SAME

(71) Applicant: FUJIFILM Corporation, Tokyo (JP)

(72) Inventor: Toshiyuki Kitahara, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/739,604

(22) Filed: Jan. 11, 2013

(65) Prior Publication Data

US 2013/0128715 A1 May 23, 2013

Related U.S. Application Data

(63) Continuation of application No. PCT/JP2011/064677, filed on Jun. 27, 2011.

(30) Foreign Application Priority Data

Jul. 13, 2010 (JP) ................................. 2010-158585

(51) Int. Cl.
*G11B 7/24* (2013.01)

(52) U.S. Cl.
USPC .............................. 369/286; 369/94; 428/64.8

(58) Field of Classification Search
None
See application file for complete search history.

(56) References Cited

U.S. PATENT DOCUMENTS

| 6,515,956 B2 | 2/2003 | Tamada |
| 7,005,174 B2 | 2/2006 | Yamasaki et al. |
| 7,062,776 B2 | 6/2006 | Takazawa |
| 7,359,310 B2 | 4/2008 | Kakiuchi et al. |
| 7,583,580 B2 | 9/2009 | Saito et al. |
| 8,054,727 B2 | 11/2011 | Shiono |

(Continued)

FOREIGN PATENT DOCUMENTS

| JP | 2001-325745 A | 11/2001 |
| JP | 2004-5815 A | 1/2004 |

(Continued)

OTHER PUBLICATIONS

Teruhiro Shiono, et al., "Two-Photon Absorption Recording in Photochromic Diarylethenes Using Laser Diode for Three-Dimensional Optical Memory", Japanese Journal of Applied Physics, May 24, 2005, pp. 3559-3563, vol. 44, No. 5B.

(Continued)

*Primary Examiner* — Wayne Young
*Assistant Examiner* — Brian Butcher
(74) *Attorney, Agent, or Firm* — Sughrue Mion, PLLC

(57) ABSTRACT

Optical information recording medium 10 comprises: a plurality of recording layers 14 which undergo a change in refractive index by irradiation with recording beam; and an intermediate layer 15 provided between the recording layers 14. The intermediate layer 15 includes first intermediate layer 15A disposed adjacent to a recording layer 14 at a side opposite to an incident side from which recording beam enters the recording layer, and second intermediate layer 15B disposed adjacent to a recording layer 14 at an incident side from which the recording beam enters the recording layer. The first intermediate layer 15A and the recording layer 14 have different refractive indices, whereas the second intermediate layer 15B and the recording layer 14 have substantially the same refractive index. The first and the second intermediate layer 15A, 15B are merged with each other at an interface therebetween, whereby refractive index gradually changes at the interface.

8 Claims, 11 Drawing Sheets

(56) References Cited

U.S. PATENT DOCUMENTS

| | | |
|---|---|---|
| 2002/0009037 A1 | 1/2002 | Tamada |
| 2003/0223350 A1 | 12/2003 | Takazawa |
| 2004/0027973 A1 | 2/2004 | Aoshima et al. |
| 2004/0174804 A1 | 9/2004 | Kakiuchi et al. |
| 2004/0247816 A1 | 12/2004 | Yamasaki et al. |
| 2006/0072437 A1 | 4/2006 | Shiono et al. |
| 2006/0256695 A1 | 11/2006 | Saito |
| 2008/0020169 A1* | 1/2008 | Haubrich et al. ............ 428/64.6 |
| 2009/0075014 A1 | 3/2009 | Miki et al. |
| 2009/0161502 A1 | 6/2009 | Shiono |
| 2012/0182851 A1* | 7/2012 | Saito et al. .................... 369/111 |

FOREIGN PATENT DOCUMENTS

| | | |
|---|---|---|
| JP | 2004-79020 A | 3/2004 |
| JP | 2004-265561 A | 9/2004 |
| JP | 2004-319046 A | 11/2004 |
| JP | 2006-344347 A | 12/2006 |
| JP | 2007-294076 A | 11/2007 |
| JP | 2009-87522 A | 4/2009 |
| JP | 4290650 B2 | 7/2009 |
| JP | 2009-277271 A | 11/2009 |
| JP | 2010-86568 A | 4/2010 |
| WO | 2007/055249 A1 | 5/2007 |

OTHER PUBLICATIONS

Teruhiro Shiono, "Two-Photon Absorption Recording in Photochromic Materials Using Laser Diode", Optronics, 2005, pp. 173-178, No. 7.

International Search Report for PCT/JP2011/064677 dated Aug. 30, 2011 in Japanese and English (5 pages).

Written Opinion for PCT/JP2011/064677 dated Aug. 30, 2011.

* cited by examiner

FIG. 8
(a)
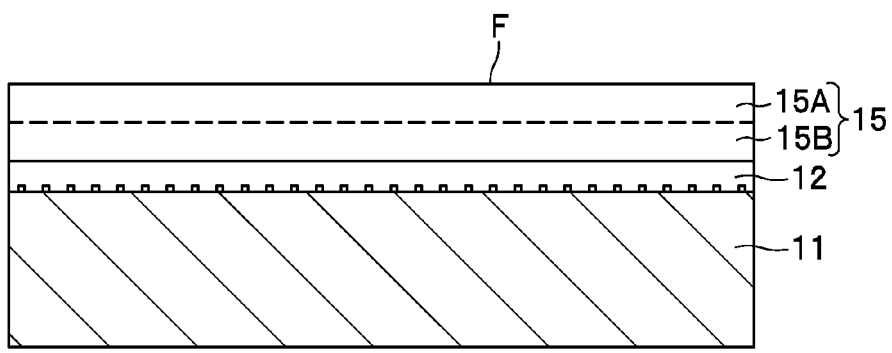
(b)
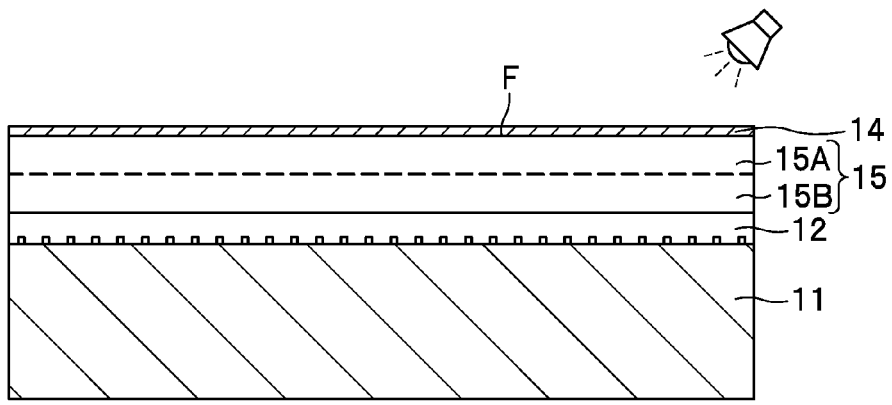
(c)
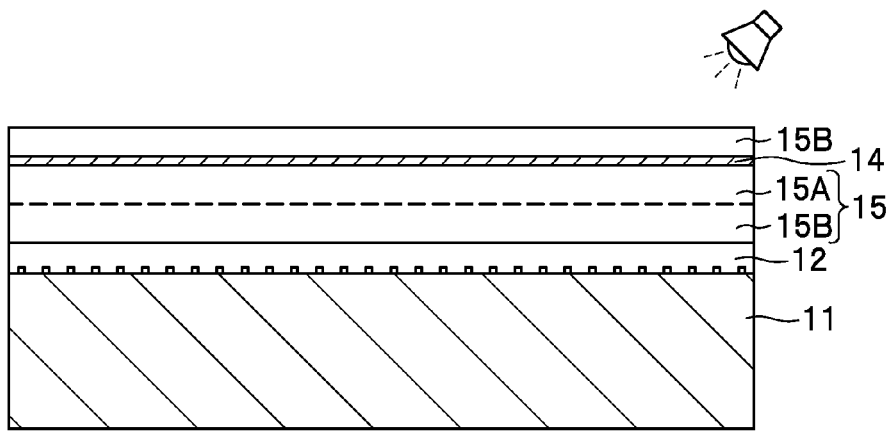

FIG. 9
(a)
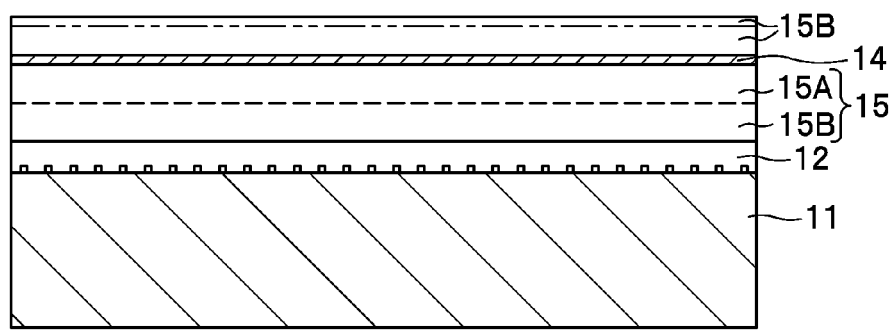
(b)

FIG. 10
(a)
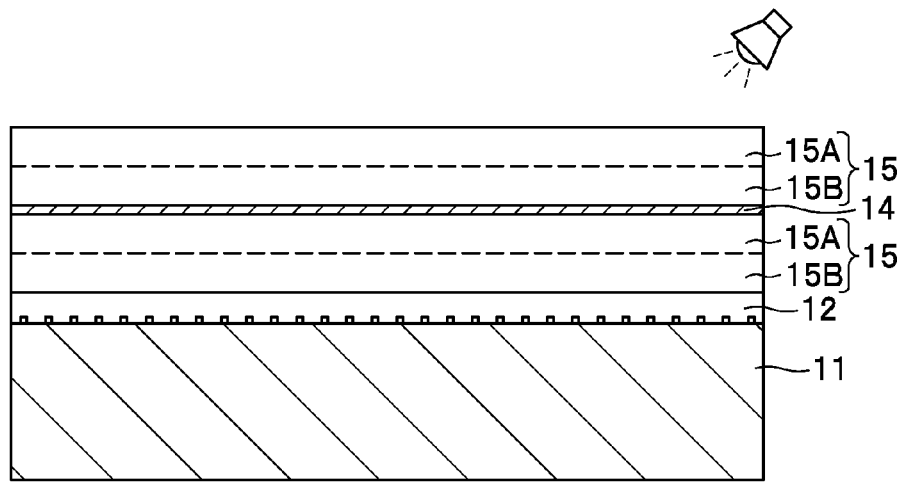
(b)
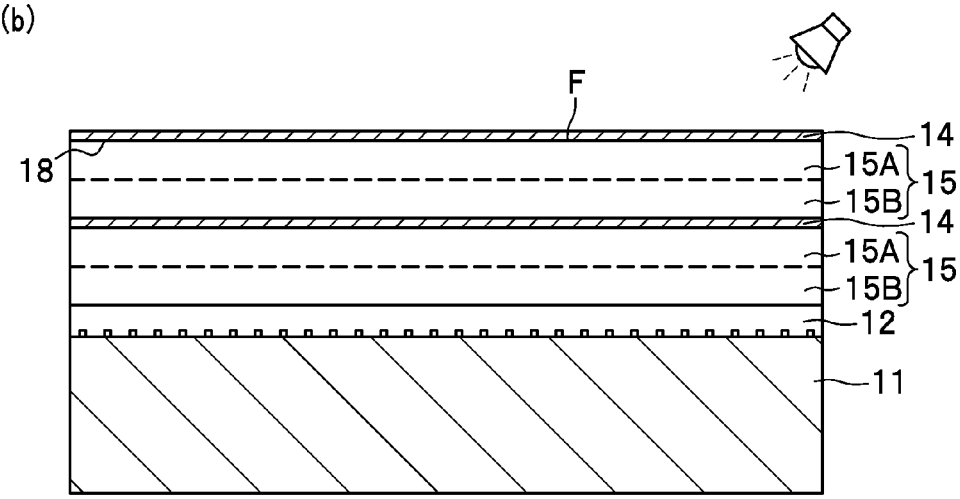

OPTICAL INFORMATION RECORDING MEDIUM AND METHOD FOR MANUFACTURING SAME

CROSS-REFERENCE TO RELATED APPLICATION(S)

This application is a continuation application of International Application No. PCT/JP2011/064677 filed on Jun. 27, 2011, which claims priority to Japanese Patent Application No. 2010-158585 filed on Jul. 13, 2010, the disclosures of which are incorporated herein by reference in their entity.

TECHNICAL FIELD

The present invention relates to an optical information recording medium and a method for manufacturing the same.

BACKGROUND ART

To record information in multiple layers of an optical information recording medium, in recent years, research has been made on a method for causing a recording material contained in the optical information recording medium to produce an optical change using a multi-photon absorption reaction such as two-photon absorption (see, for example, Patent Literature 1). Similar to a widely-used conventional optical information recording medium with a single recording layer, according to an optical information recording medium utilizing a multi-photon absorption reaction, a change in the refractive index of a recording material at a recording region and the thickness of the recording layer are determined, in consideration of the fact that reflected lights reflected at both upper and lower interfaces of the recording layer interfere with each other upon reading out the information (this is called interference effect), such that the difference between the reflectivity at a recorded portion and the reflectivity at a non-recorded portion (i.e., difference in the ratio of light beams which are reflected at the upper and lower interfaces of the recording layer and interfere with each other, and thereafter return to an optical pickup) is large. In an information recording medium disclosed in Patent Literature 1, consideration is made on the relationship between the film thickness and the reflectivity as shown in FIG. 2 of this literature, and the paragraph [0062] suggests that the thickness of the recording layer is preferably around λ/4n, where λ is the wavelength of the readout beam, and n is the refractive index of the recording layer, or even thinner to have a thickness of around 5-50 nm.

Another optical information recording medium which does not utilize interference effect as utilized in above literature is disclosed in Patent Literature 2. According to this known optical information recording medium, a fluorescent-light emission layer is provided under the recording layer, and the light emitted by the fluorescent-light emission layer is detected through the recording layer to read out the information.

CITATION LIST

Patent Literature

Patent Literature 1: Japanese Patent No. 4290650
Patent Literature 2: Japanese laid-open patent application publication No. 2001-325745

SUMMARY OF THE INVENTION

Technical Problem

However, if the interference effect of the reflected lights reflected at both interfaces of the recording layer is utilized upon reading out the information as with Patent Literature 1, the recording layer must be produced to have so exact film thickness as designed to obtain an excellent degree of modulation. This requires the accuracy of the film thickness and thus leads to increased manufacturing cost of the optical information recording medium.

Further, if, as with Patent Literature 2, a fluorescent light emitted is regarded as a base light and the modulation is obtained from the variations of the light received by a light detector for detecting how much of the base light returns, it is difficult to obtain an acceptable reproduction output because the emitted fluorescent light is very weak.

In view of the above, the present invention seeks to provide an optical information recording medium and a method for manufacturing the optical information recording medium, which provides an excellent reproduction output without requiring highly-accurate film thickness of the recording layer.

Solution to Problem

In order to solve the aforementioned problem, the present invention provides an optical information recording medium comprising: a plurality of recording layers, each of which undergoes a change in a refractive index by irradiation with a recording beam; and at least one intermediate layer. The intermediate layer is a composite layer including a first intermediate layer and a second intermediate layer, and is located between two adjacent recording layers. The first intermediate layer is disposed adjacent to one of the two recording layers at a side opposite to an incident side from which a recording beam enters the recording layer, and a refractive index of the first intermediate layer is different from that of the recording layer. The second intermediate layer is disposed adjacent to the other one of the two recording layers at an incident side from which the recording beam enters the recording layer, and a refractive index of the second intermediate layer is substantially the same as that of the recording layer. The first intermediate layer and the second intermediate layer are merged with each other at an interface therebetween, whereby a refractive index gradually changes at the interface.

According to this optical information recording medium, if the recording layer is irradiated with light and the recording layer undergoes a change in refractive index to have a lens effect as described later, as seen from a direction from which a reading beam (light irradiated for reading out information) enters the recording layer upon reading out the information, the reading beam is reflected at an interface between the recording layer and an adjacent first intermediate layer disposed at a far side of the recording layer (this interface is referred to as a "far-side interface" in this specification), but the reading beam is not reflected at an interface between the recording layer and an adjacent second intermediate layer disposed at a near side of the recording layer (this interface is referred to as a "near-side interface" in this specification). Further, the reading beam does not reflect at an interface between the first intermediate layer and the second intermediate layer (this interface is referred to as an "intermediate interface"). Therefore, reflections at the near-side interface and the intermediate interface do not disturb detection of the reflected light at the far-side interface, with the result that the information is regenerated with a high signal-to-noise ratio.

In the aforementioned optical information recording medium, the recording layers may be made of resin which contains dye, and the first intermediate layer and the second intermediate layer may be made of resin which is transparent to the recording beam.

Further, the aforementioned optical information recording medium is preferably configured to satisfy $0.001 < ((n2-n1)/(n2+n1))^2 < 0.04$, where $n1$ is the refractive index of the recording layer, and $n2$ is the refractive index of the first intermediate layer.

As $((n2-n1)/(n2+n1))^2$, namely reflectivity, is greater than 0.001, the intensity of the reflected light at the far-side interface is sufficiently ensured so as to enable reading of the information. Whereas, as the reflectivity is smaller than 0.04, the intensity of the reflected light at the far-side interface is appropriately small so that the recording beam and the reading beam can reach far deeper recording layers, thereby allowing a large number of recording layers to be provided to achieve high capacity recording.

In the optical information recording medium according to the present invention, since substantially no reflection occurs at the near-side interface and the intermediate interface, if the reflectivity determined by taking into account the reflection at the near-side interface, the reflection at the far-side interface, and the reflection at the intermediate interface should be constant, the reflectivity at the far-side interface can be set to a greater value as compared to a medium in which reflection occurs at the near-side interface and at the intermediate interface. This ensures higher signal-to-noise ratio upon reading out information.

A method for manufacturing the aforementioned optical information recording medium comprises: a first step of applying a material for the recording layer to a recording layer forming surface; a second step of curing the recording layer; a third step of applying a material for the second intermediate layer on top of the recording layer; a fourth step of applying a material for the first intermediate layer before curing or after partially curing the second intermediate layer applied in an immediately preceding step; and a fifth step of curing the first intermediate layer and the second intermediate layer. These steps are repeatedly carried out.

Applying a material for the second intermediate layer on top of the recording layer after curing the recording layer causes the recording layer and the second intermediate layer to be clearly separated at the near-side interface. However, since the recording layer and the second intermediate layer have substantially the same refractive index, reflection at the near-side interface is restricted. Further, applying a material for the first intermediate layer before curing or after partially curing the applied second intermediate layer causes the material for the second intermediate layer and the material for the first intermediate layer to be dispersed and slightly merged with each other. Thereafter, the first intermediate layer and the second intermediate layer having been merged in this way are cured simultaneously, so that an optical information recording medium, in which the second intermediate layer and the first intermediate layer are merged with each other at the intermediate interface, can be manufactured. This can suppress reflection at the intermediate interface. Further, since these steps are repeatedly carried out, a recording layer is applied on top of the first intermediate layer having already been cured, so that the first intermediate layer and the recording layer are not merged at the far-side interface and a clearly separated interface is formed therebetween. Accordingly, reflection occurs at the far-side interface.

The aforementioned manufacturing method may further comprise: a sixth step of curing the second intermediate layer; and a seventh step of applying a material for the second intermediate layer on top of the second intermediate layer, and the sixth and seventh steps are carried out between the third step and the fourth step.

In the aforementioned manufacturing method, application of the material for the recording layer, application of the material for the first intermediate layer, and application of the material for the second intermediate layer may be carried out by spin coating.

In the aforementioned manufacturing method, the material for the recording layer, the material for the first intermediate layer, the material for the second intermediate layer may contain light curing resin, and the material for the recording layer, the material for the first intermediate layer, and the material for the second intermediate layer may be cured in the second step and in the fifth step by irradiation with light. Similarly, the material for the second intermediate layer may be cured also in the sixth step by irradiation with light.

Other aspects and advantages of the present invention will become apparent from the following detailed description taken in conjunction with the accompanying drawings.

BRIEF DESCRIPTION OF THE DRAWINGS

FIG. 8 is an explanatory view showing a manufacturing method for an optical information recording medium, which includes steps (a) to (c);

FIG. 9 is an explanatory view showing a manufacturing method for an optical information recording medium, which includes steps (a) and (b);

FIG. 10 is an explanatory view showing a manufacturing method for an optical information recording medium, which includes steps (a) and (b)

DESCRIPTION OF EMBODIMENTS

One exemplified embodiment of the present invention will be described below with reference to the drawings.

Figure 1:
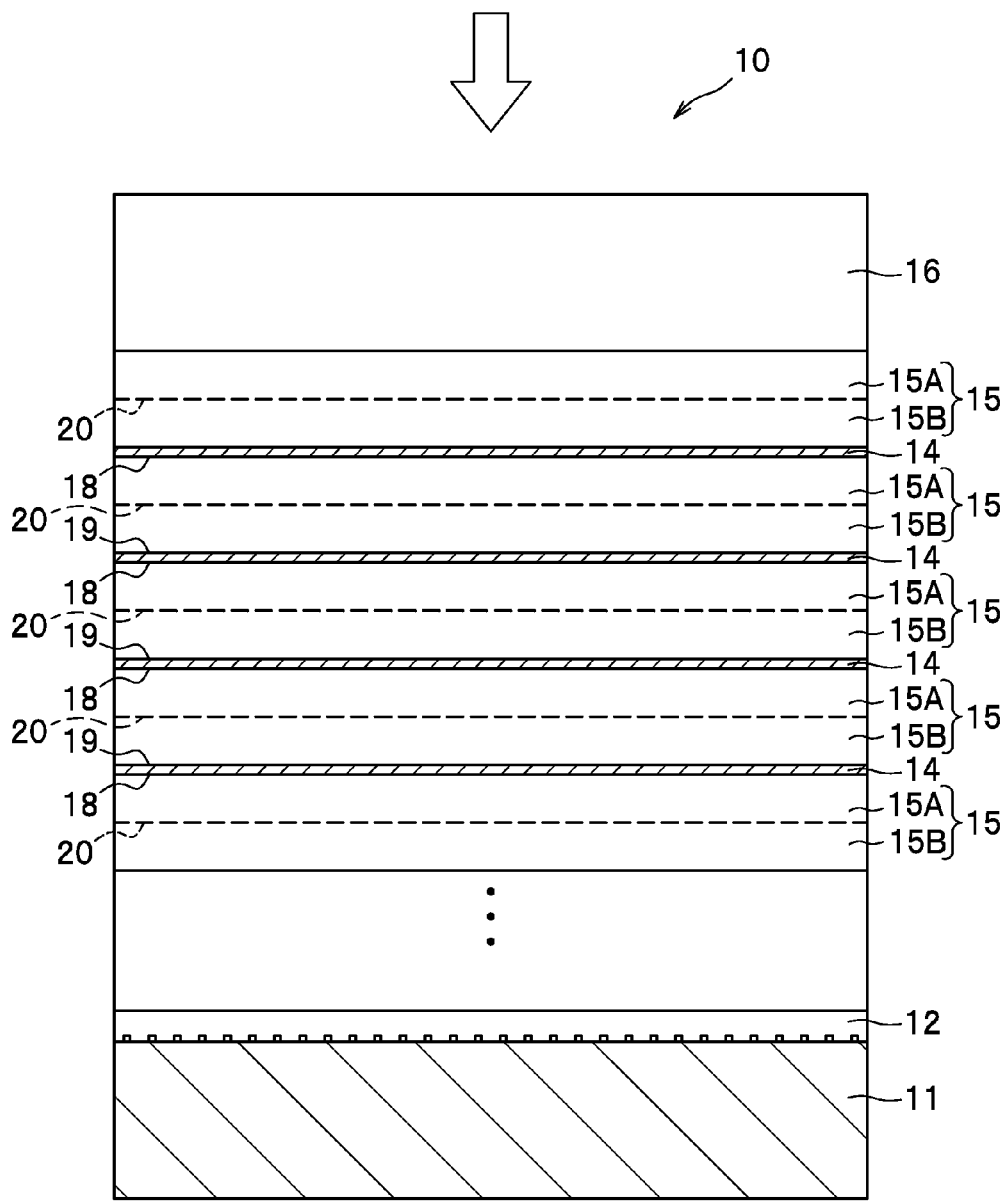
FIG. 1 is a sectional view of a multi-layered optical information recording medium.

As seen in FIG. 1, an optical information recording medium 10 according to one embodiment of the present invention comprises a substrate 11, a servo signal layer 12, a plurality of recording layers 14, a plurality of intermediate layers 15, and a cover layer 16.

The substrate 11 is a support member for supporting the recording layers 14 and other layers. As an example, the substrate 11 is a circular plate made of polycarbonate. The material and the thickness of the substrate 11 are not specifically limited.

The servo signal layer 12 is made of a tacky or adhesive resinous material and configured to retain the recording layers 14 and the intermediate layers 15 on the substrate 11. A servo signal is previously recorded in the servo signal layer 12 at a surface close to the substrate 11; the servo signal is recorded as an irregular pattern or by utilizing the change in the refractive index. Herein, the servo signal is a previously set signal for assisting a recording and reading apparatus 1 to recognize the servo signal layer 12 as a focus reference surface during recording and reading out the information. To bring the focus on a predetermined recording layer 14, focus control is performed taking into account the distance from the reference surface and the number of interfaces. Further, to accurately irradiate the track of the circumferentially arranged recording spots with a laser beam at the time of recording and reading out the information, it is preferable that a tracking servo signal or a groove for tracking is previously provided. It is to be noted that the presence or absence of the servo signal layer 12 may be optional.

The recording layer 14 is made of a photosensitive material on which information is optically recordable. Irradiating the recording layer 14 with a recording beam (irradiated light for recording) causes the recording layer 14 to undergo a change in the refractive index. Change in the refractive index caused by irradiation of the recording beam may be an increase from a lower state to a higher state or alternatively a decrease from a higher state to a lower state. As an example in this embodiment, a recording material which undergoes a change in the refractive index from a higher state to a lower state is used in the recording layer 14. In order to provide the recording layer 14 having an appropriate thickness and to change the refractive index of the recording layer using the heat generated as a result of dye absorbing light, it is preferable that the material for the recording layer 14 is resin which contains dye for allowing one-photon absorption or multi-photon absorption of the recording beam. The resin containing the dye may be prepared, for example, by dispersing the dye in a polymer binder. Specific examples of the polymer binder may include polyvinyl acetate (PVAc), polymethylmethacrylate (PMMA), polycarbonate (PC), polystyrene (PS), and polyvinyl alcohol (PVA). In this embodiment, the polymer binder contains, as the material for the recording layer 14, light curing resin (UV curable resin) which is cured by irradiation with light (ultraviolet light).

Examples of the recording beam-absorbing dye may include dyes which have been conventionally used as a thermally deformable heat mode type recording material. For example, a phthalocyanine-based compound, an azo compound, an azo metal complex compound, and methine dyes (e.g., a cyanine-based compound, an oxonol-based compound, a styryl dye, and a merocyanine dye) may be used as the recording beam-absorbing dye. Further, to minimize adverse effects on adjacent recording layers during recording on and reading from the recording medium having a multi-layered recording layers, it is preferable that a multi-photon absorption dye is used as the recording beam-absorbing dye. As an example of the multi-photon-absorption dye, a two-photon absorption compound without having a linear absorption band at the wavelength of a reading beam is preferable.

As long as the two-photon absorption compound does not have a linear absorption band at the wavelength of the reading beam, any known two-photon absorption compound may be used; for example, compounds having a structure represented by the following formula (1) may be used.

[Chem. 1]

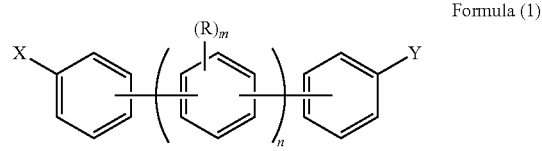

Formula (1)

In Formula (1), each of X and Y may represent a substituent having a Hammett's sigma para-value (σp value) of 0 or more, which may be the same with or different from each other; n represents an integer of 1 to 4; R represents a substituent, and a plurality of RS may be the same with or different from each other; and m represents an integer of 0 to 4.

In Formula (1), each of X and Y represents a group having a σp value taking a positive value in Hammett equation, i.e., what is called an electron-withdrawing group, preferably, e.g., a trifluoromethyl group, a heterocyclic group, a halogen atom, a cyano group, a nitro group, an alkylsulfonyl group, an arylsulfonyl group, a sulfamoyl group, a carbamoyl group, an acyl group, an acyloxy group, an alkoxycarbonyl group and the like, more preferably a trifluoromethyl group, a cyano group, an acyl group, an acyloxy group, and an alkoxycarbonyl group, and most preferably a cyano group and a benzoyl group. Of these substituents, an alkylsulfonyl group, an arylsulfonyl group, a sulfamoyl group, a carbamoyl group, an acyl group, an acyloxy group and an alkoxycarbonyl group may further have a substituent for various purposes including giving solubility in a solvent. The examples of the substituents include an alkyl group, an alkoxy group, an alkoxyalkyl group, an aryloxy group, etc.

n represents an integer of 1 or more and 4 or less, preferably 2 or 3, and most preferably 2. If n is 5 or more, it is said that the greater n becomes, the more the linear absorption appears at the longer wavelength side, so that non-resonant two-photon absorption recording is not done with a recording beam at a wavelength band shorter than 700 nm.

R represents a substituent. The substituent is not specifically limited, and an alkyl group, an alkoxy group, an alkoxyalkyl group, and an aryloxy group are exemplified as specific examples. m represents an integer of 0 or more and 4 or less.

The compound having the structure represented by Formula (1) is not specifically limited; for example, compounds represented by the following chemical structural formulae D-1 to D-21 may be used.

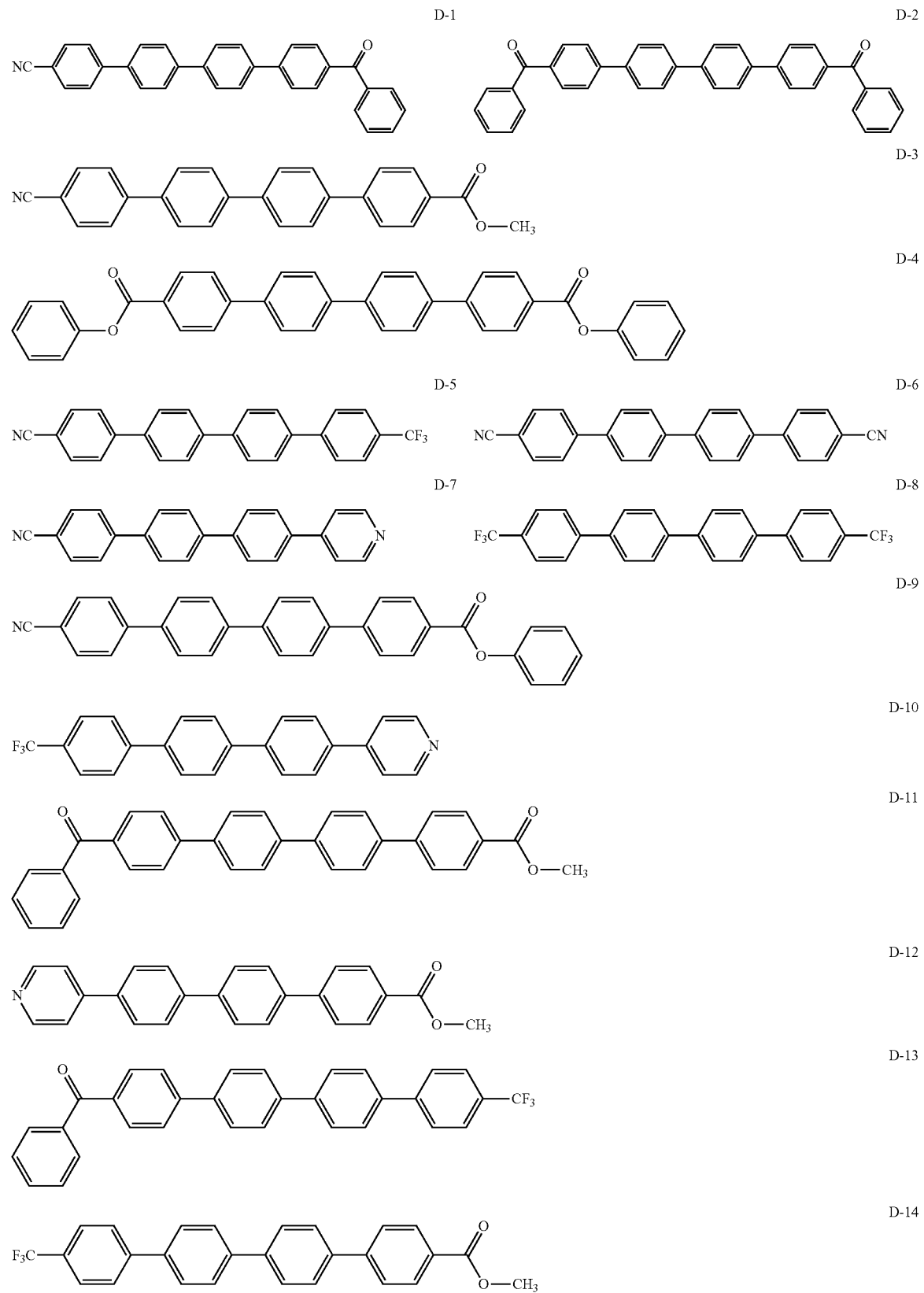

-continued

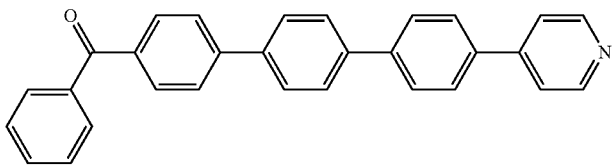

D-15

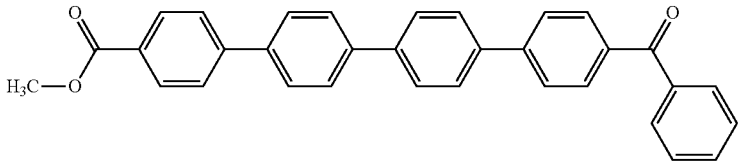

D-16

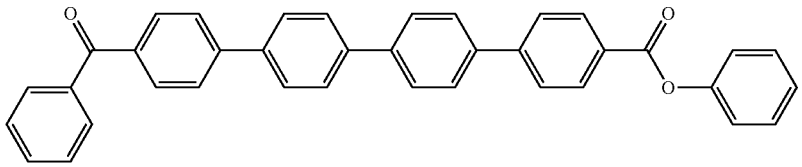

D-17

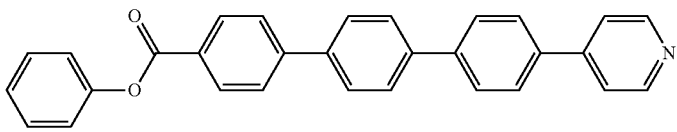

D-18

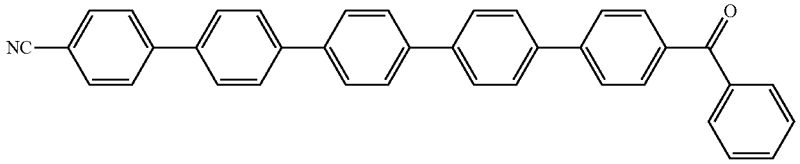

D-19

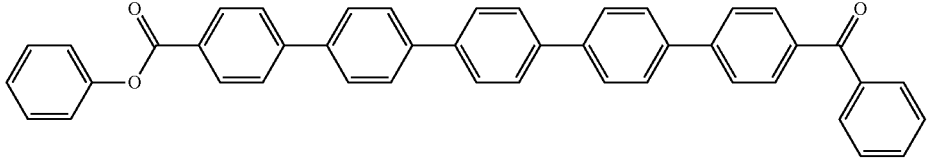

D-20

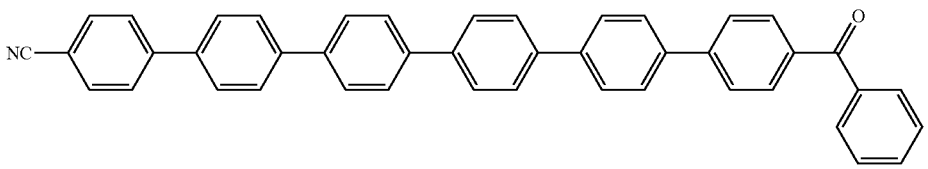

D-21

Figure 2:
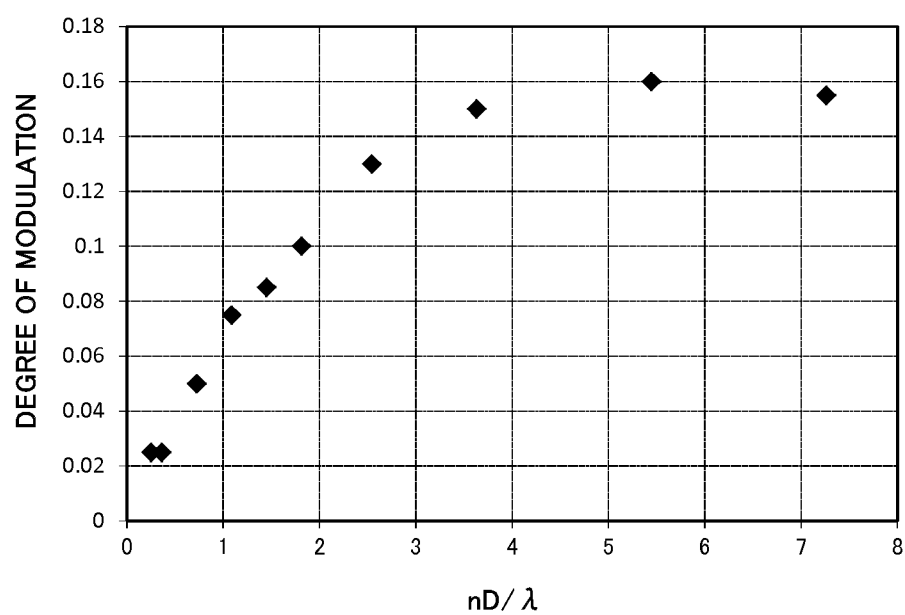
FIG. 2 is a graph showing the relationship between thickness of the recording layer and degree of modulation.

The recording layer 14 has a sufficient thickness so that the distribution of the refractive index to be formed after recording achieve a lens effect. To be more specific, the recording layer 14 has a thickness equal to or greater than 2λ/n, where λ is the wavelength of the recording beam and n is the refractive index of the recording layer 14. As seen in FIG. 2, when calculating the relationship between nD/λ (where D is the thickness of the recording layer) and degree of modulation (i.e., value obtained from the intensity of the detected light by (Maximum value−Minimum value)/Maximum value), if nD/λ is equal to or greater than 2, the degree of modulation is 0.1 or more, and it is thus shown that an excellent degree of modulation is achieved. This reveals that the thickness D is preferably equal to or greater than 2λ/n.

As an example, if the wavelength of the recording beam is 522 nm and the refractive index of the recording layer 14 is 1.40, the thickness of the recording layer 14 should be 745 nm or more. This thickness is several-fold thicker than that of the conventional optical information recording medium utilizing interference effect. Accordingly, when a recording spot is formed in the recording layer 14, the recording spot has a lens effect.

Although the thickness of the recording layer 14 does not have an upper limit, it is preferable that the thickness thereof is equal to or smaller than 5 μm in order to increase the number of recording layers 14 to as many as possible. In this embodiment, as an example, the thickness of the recording layer 14 is 1 μm. The number of recording layers 14 provided is, for example, approximately from 2-100 layers. To increase the storage capacity of the optical information recording medium 10, a large number of recording layers 14, for example, 10 or more recording layers 14 are preferable.

As seen in FIG. 1, each intermediate layer 15 is disposed between a plurality of recording layers 14. In other words, intermediate layers 15 are disposed adjacent to upper and lower sides of each recording layer 14. In order to prevent crosstalk across a plurality of recording layers 14 (i.e., phenomenon by which a signal from one recording layer 14 is mixed with another signal from an adjacent recording layer 14), the intermediate layer 15 is provided to form a predetermined amount of space between the adjacent recording layers 14. For this purpose, the thickness of the intermediate layer 15 is equal to or more than 3 μm. As an example, the intermediate layer 15 is 10 μm thick in this embodiment.

Each (one) intermediate layer 15 includes a first intermediate layer 15A and a second intermediate layer 15B adjacent to and disposed under the first intermediate layer 15A. The first intermediate layer 15A is adjacent to a recording layer 14 which is disposed at the upper side of the intermediate layer 15, and the second intermediate layer 15B is adjacent to a recording layer 14 which is disposed at the lower side of the intermediate layer 15. In the meantime, if attention is focused on one recording layer 14, the first intermediate layer 15A is disposed adjacent to the recording layer 14 at a side opposite to an incident side from which the recording beam enters the recording layer 14, whereas the second intermediate layer 15B is disposed adjacent to the recording layer 14 at the incident side from which the recording beam enters the recording layer 14.

The first intermediate layer 15A and the second intermediate layer 15B are made of materials which are unreactive to irradiation with a laser beam at the time of recording and reading information. Further, in order to minimize the loss of the recording beam, the reading beam, and the readout beam (light generated by irradiation with the reading beam), it is preferable that the first intermediate layer 15A and the second intermediate layer 15B are made of resin which is transparent to the recording beam, the reading beam, and the readout beam. Herein, the term "transparent" indicates that the absorption ratio determined by taking into consideration the absorption ratio of first intermediate layer 15A and the absorption ratio of the second intermediate layer 15B is equal to or less than 1%. Further, in this embodiment, UV curable resin is contained in the material for the first intermediate layer 15A and the material for the second intermediate layer 15B as with the material for the recording layer 14.

As seen from a direction from which the recording beam and other beams enter the recording layer 14 (i.e., from upper side of FIG. 1), the first intermediate layer 15A is adjacent to and disposed at the lower side (far side) of the recording layer 14. The refractive index of the first intermediate layer 15A is different from that of the recording layer 14. Accordingly, reflection of the reading beam derived from an abrupt change in the refractive index occurs at an interface (far-side interface 18) between the recording layer 14 and the first intermediate layer 15A. It is preferable that the refractive index of the first intermediate layer 15A be different to some appropriate degree from that of the recording layer 14. To be more specific, it is preferable that the following relation is satisfied:

$$0.001 < ((n2-n1)/(n2+n1))^2 < 0.04$$

where $n1$ is a refractive index of the recording layer 14, and $n2$ is a refractive index of the first intermediate layer 15A.

If $((n2-n1)/(n2+n1))^2$ is greater than 0.001, the quantity of the reflected light at the far-side interface 18 is large, so that a high signal-to-noise ratio is obtained at the time of reading the information. Whereas, if $((n2-n1)/(n2+n1))^2$ is smaller than 0.04, the quantity of the reflected light at the far-side interface 18 is restricted to an appropriately small degree, so that a record/readout beam (i.e., beam including a recording beam, a reading beam, and a readout beam in this specification) can reach far deeper recording layers 14 without considerable attenuation of the record/readout beam upon recording and reading out the information.

As an example, the refractive index $n2$ of the first intermediate layer 15A is 1.61. If the refractive index $n1$ of the recording layer 14 is 1.40, $((n2-n1)/(n2+n1))^2$ is 0.0049 and the aforementioned inequality expression is satisfied.

As seen from the direction from which the recording beam and other beams enter the recording layer 14, the second intermediate layer 15B is adjacent to and disposed at the upper side (near side) of the recording layer 14. The refractive index of the second intermediate layer 15B is substantially the same as that of the recording layer 14. According to the present invention, it is preferable that the reflectivity is sufficiently smaller at the interface (near-side interface 19) between the recording layer 14 and the second intermediate layer 15B than at the far-side interface 18. If the reflected light from the near-side interface 19 and the reflected light from the far-side interface 18 interfere with each other, the reproduction output would be higher or lower in accordance with a change in the thickness of the recording layer 14. Such variation in the reproduction output does not afford even an extremely small error (e.g., a fraction of the wavelength of the readout beam or less) in the thickness of the recording layer 14. It is therefore very difficult to manufacture an actual medium such that recording layers 14 having, for example, 1 μm thick are accurately and uniformly formed so as not to cause any variation in the reproduction output as described above. From this point of view too, it is important that the reflectivity at the near-side interface 19 is sufficiently smaller than that at the far-side interface 18.

Accordingly in the present invention, the reflectivity at the near-side interface 19 is equal to or less than one-fifth of the reflectivity at the far-side interface 18, preferably equal to or less than one-tenth, and most preferably, the reflectivity at the near-side interface 19 is 0. To satisfy this condition, it is necessary that the recording layer 14 and the second intermediate layer 15B have substantially the same refractive index. To be more specific, "having substantially the same refractive index" in this specification means that the difference between the refractive index of the recording layer 14 and the refractive index of the second intermediate layer 15B is equal to or less than 0.05, preferably equal to or less than 0.03, more preferably equal to or less than 0.01, and most preferably, the difference between them is 0. Accordingly, reflection derived form an abrupt change in the refractive index does not occur at the near-side interface 19, so that the record/readout beam is allowed to pass though the near-side interface 19 without reflection.

In order to make the difference between the refractive index of the recording layer 14 and the refractive index of the second intermediate layer 15B smaller and preferably to 0, the composition of the material for the recording layer 14 and the composition of the material for the second intermediate layer 15B can be adjusted. To be more specific, since the material for the recording layer 14 contains dye such as a two-photon absorption compound to be mixed in a polymer binder, the dye or the polymer binder may be selectively adjusted to have an appropriate refractive index and to vary the composition ratio, whereby the refractive index of the recording layer 14 can be optionally adjusted. The refractive index of the polymer binder varies depending on the degree of polymerization even if they have similar basic components. For this reason, the refractive index of the recording layer 14 can also be adjusted using polymer binders with different degrees of polymerization or by adjusting the degree of polymerization of the polymer binder. Further, the refractive index of the recording layer 14 can be adjusted by mixing a plurality of polymer binders. Further, a refractive index matching material (inorganic particulate and the like) may be added to adjust the refractive index of the recording layer 14.

For adjusting the refractive index of the second intermediate layer 15B, the degree of polymerization of the polymer material such as resin usable as the material for the second intermediate layer 15B may be adjusted. As an alternative, to adjust the refractive index of the second intermediate layer 15B, a material usable for the intermediate layer 15 may be optionally added or a refractive index matching material (inorganic particulate and the like) may be added.

The first intermediate layer 15A and the second intermediate layer 15B, by which one intermediate layer 15 is formed, are merged with each other at the interface (intermediate interface 20) therebetween, whereby the refractive index gradually changes at this interface. Namely, an interface is not clearly formed at the intermediate interface 20. Accordingly, reflection derived form an abrupt change in the refractive index does not occur at the intermediate interface 20, so that the record/readout beam is allowed to pass though the intermediate interface 20 without reflection.

The cover layer 16 is provided to protect the recording layers 14 and the intermediate layers 15 (first intermediate layers 15A and second intermediate layers 15B). The cover layer 16 is made of a material which allows the record/readout beam to pass through the cover layer 16. The cover layer 16 has an appropriate thickness in the range from several tens micro meters to several millimeters.

Description will be given of the method for recording information on and reading out the information from the optical information recording medium 10 as described above.

Figure 3:
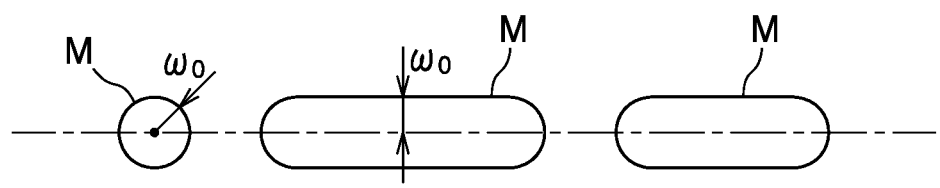
FIG. 3 is a top view of recording spots.
Figure 5:
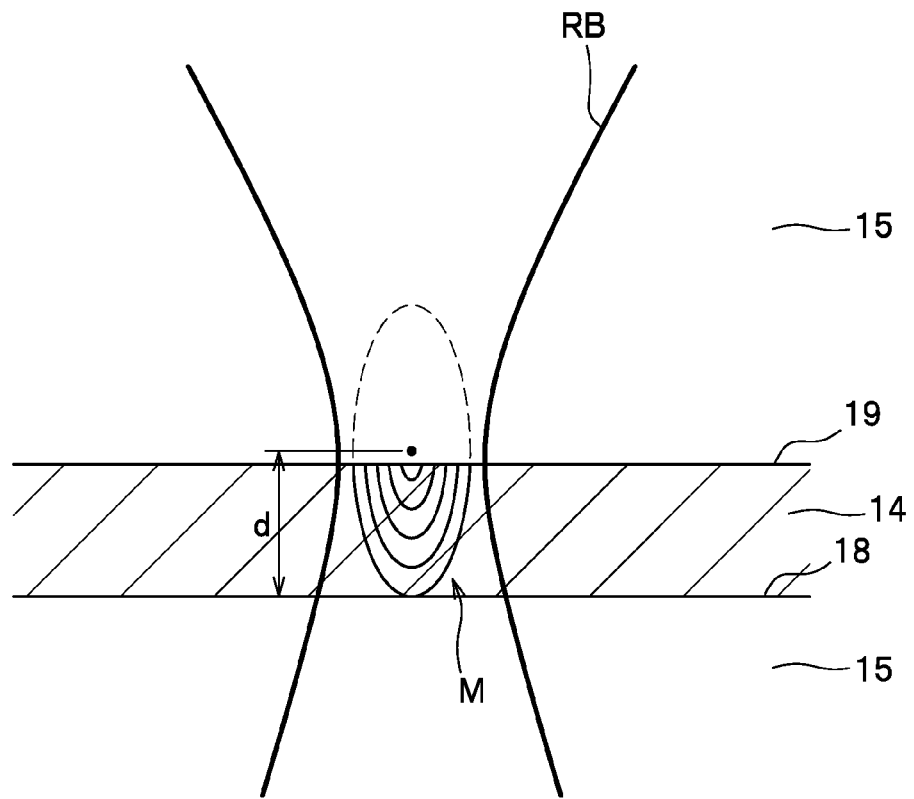
FIG. 5 is an explanatory view showing a focal position at the time of recording information and formation of a recording spot.

For recording information in a desired recording layer 14, the recording layer 14 is irradiated with a laser beam (recording beam RB) output of which is modulated in accordance with the information to be recorded. If the recording layer 14 contains a multi-photon absorption compound as a main recording dye, it is preferable that the laser beam used for this recording may be a pulsed laser beam, the peak power of which can be increased. As seen in FIG. 5, it is preferable that a focal position of the recording beam RB is shifted by an offset amount d, which satisfies $\omega_0 < d < 3\omega_0$, from the far-side interface 18 toward the incident side of the recording beam RB. Herein, $\omega_0$ is the radius of the recording spots M shown in FIG. 3. As with the recording spot M shown in the left side of FIG. 3, the radius $\omega_0$ indicates the radius of a circular spot formed when the recording beam RB and the optical information recording medium 10 are not moved relatively to each other. If an elongated recording spot is obtained as a result of a relative movement between the recording beam RB and the optical information recording medium 10 as with the two recording spots M shown in the middle and the right side of FIG. 3, the radius $\omega_0$ is determined as a half of the width of the recording spot M.

Figure 4:
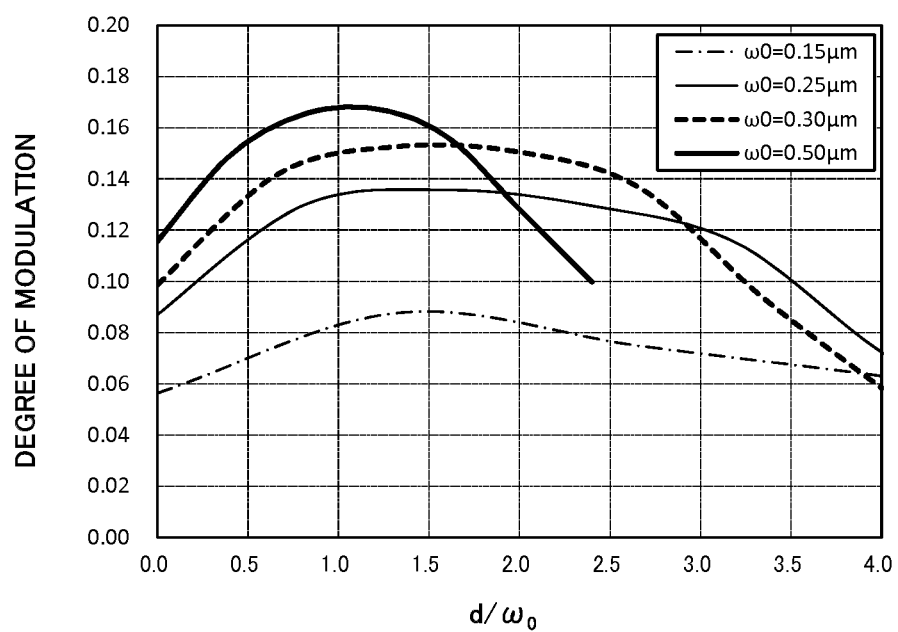
FIG. 4 is a graph showing the relationship between $d/\omega_0$ and degree of modulation.

Description will be given of the range of the offset amount d. First, the radius $\omega_0$ of a fine spot which can be formed by the laser beam is considered to be in the range of 0.1-0.3 µm. The radius $\omega_0$ of the spot to be recorded is determined from the diffraction limit which is determined by the wavelength of the recording beam used and the numerical aperture NA of the objective lens. It is preferable that the radius $\omega_0$ is approximately in the range of 0.1-0.3 µm taking into consideration the surface recording density per one recording layer 14 and the wavelength of the recording laser used. Calculating the relationship between the ratio $\omega_0$ of the offset amount d to the radius $\omega_0$ and the degree of modulation as shown in FIG. 4 reveals that better degree of modulation can be obtained if $\omega_0 = 0.15$-$0.3$ µm and the value of $d/\omega_0$ is in the range of 1-3. Therefore, it is said that better offset amount d is in the range of $\omega_0 < d < 3\omega_0$. In this calculation, the thickness of the recording layer 14 is 1 µm.

When the recording layer 14 is irradiated with the recording beam RB as described above, as schematically illustrated in FIG. 5, depending on the intensity of light, a light absorption reaction is induced more in the proximity of the focal point where the intensity of the light is strong (light is absorbed proportionally to the square of the intensity of the light in the case of the two-photon absorption reaction), at which position the refractive index is small in proportion to this reaction. For this reason, the distribution of the refractive index is formed in the recording layer 14 of 1 µm thick. The recording spot M with this distribution of the refractive index acts as a lens.

Figure 6:
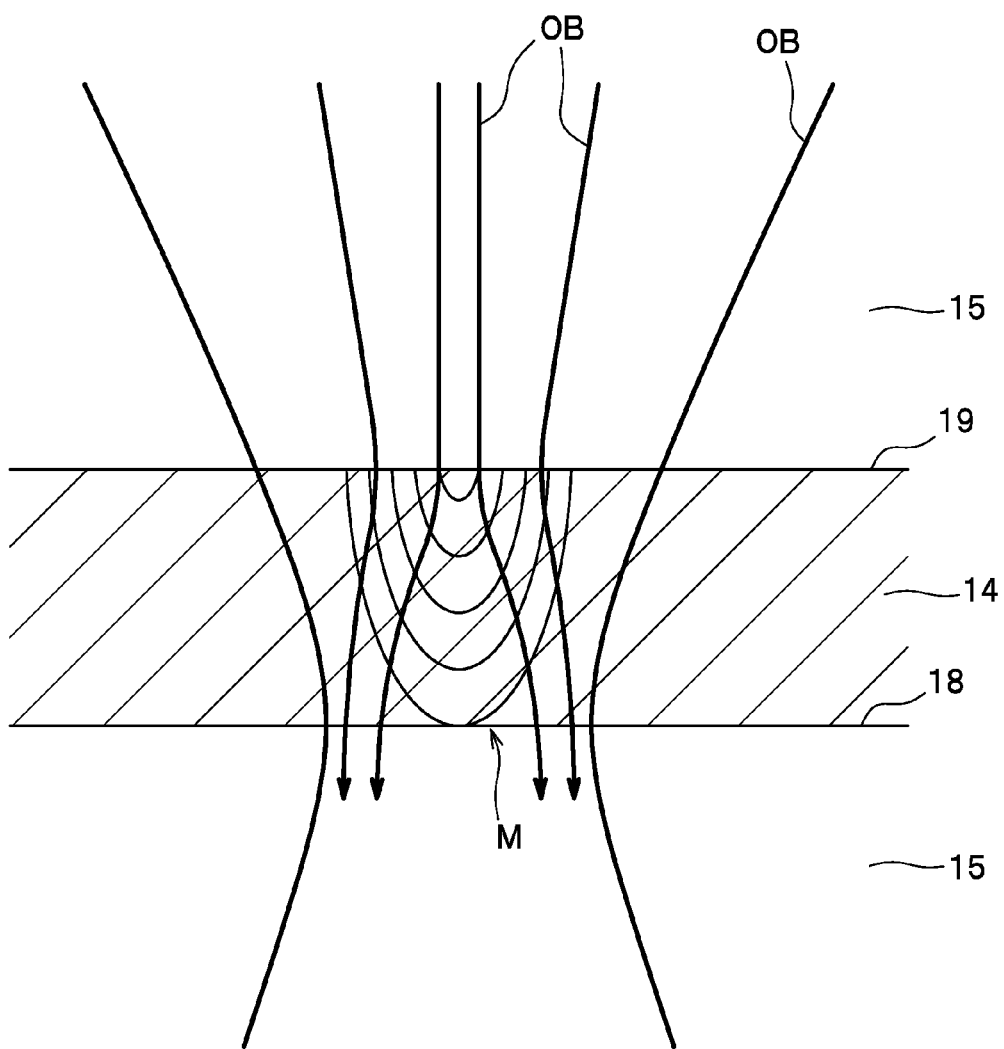
FIG. 6 is an explanatory view showing a focal position at the time of reading out the information and the lens effect at the recording spot.
Figure 7:
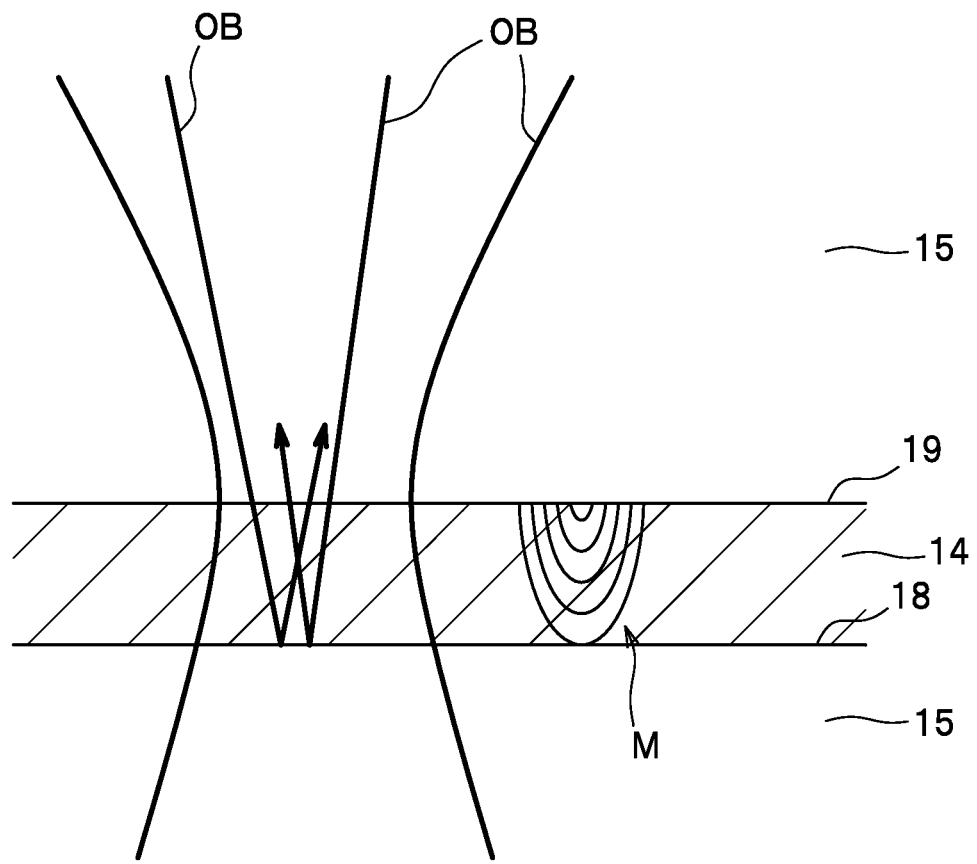
FIG. 7 is an explanatory view showing a focal position at the time of reading out the information and the reflection of the reading beam at a non-recorded position.

For reading out the information from a desired recording layer 14, the recording layer 14 is irradiated with a CW laser beam (reading beam OB). In this instance, as seen in FIG. 6, the focal position of the reading beam OB is adjusted with the far-side interface 18 between the recording layer 14 and the intermediate layer 15 (first intermediate layer 15A) set as a target. The reading beam OB then enters the recording spot M, and due to the lens effect of the recording spot M, it advances along a path diverging from the recording spot M. For this reason, almost no light is reflected at the far-side interface 18 of the recording spot M. Meanwhile, as seen in FIG. 7, at a non-recorded portion of the recording layer 14, which is a portion other than recording spots M, the reading beam OB is reflected at the far-side interface 18 and therefore a difference in the intensity of the reflected light is obtained between the recorded portion and the non-recorded portion. Therefore, the information is regenerated.

As described above, according to the optical information recording medium 10 in this embodiment, recording and reading of information is carried out by making use of a difference in the reflectivity between a recorded portion and a non-recorded portion of the far-side interface 18. However, according to the conventional recording method, the information is regenerated by making use of interference effect between the reflection at the far-side interface 18 and the reflection at the near-side interface 19, and therefore the reflection at the near-side interface 19 is indispensable. Contrary to the conventional recording method, the reflection at the near-side interface 19 is not necessary for the recording method described in this embodiment, but rather considered as noise.

For this reason, as described in this embodiment, the refractive index of the second intermediate layer 15B which is adjacent to the recording layer 14 at the near-side interface 19 is made to be substantially the same as the refractive index of the recording layer 14, so that reflection of the record/readout beam does not occur at the near-side interface 19. Further, the refractive index of the first intermediate layer 15A and the refractive index of the second intermediate layer 15B gradually change at the interface (intermediate interface 20) between the second intermediate layer 15B and the first intermediate layer 15A having a refractive index different from that of the recording layer 14, so that reflection of the record/readout beam does not occur at the intermediate interface 20. These can improve the signal-to-noise ratio of the readout beam, so that excellent regeneration output is obtained.

Further, according to the optical information recording medium 10 as described above in this embodiment, since the modulation for the reproduction output (intensity of the reflected light) is obtained between the recorded portion and the non-recorded portion without using interference effect and by making use of the lens effect of the recording spot M formed in the recording layer 14, the optical information recording medium 10 can be manufactured without requiring highly-accurate film thickness of the recording layer 14 and thus with reduced manufacturing cost. Further, since the reflection of the reading beam at the far-side interface 18 is used upon reading out the information, a higher reproduction output is obtained as compared with a method utilizing fluorescence.

Next, description will be given of a manufacturing method for the optical information recording medium 10.

As seen in FIG. 8 (*a*), an intermediate layer 15 is formed on a workpiece consisting of a substrate 11 and a servo signal layer 12 formed on top of the substrate 11. Accordingly, the surface of the intermediate layer 15 provides a recording layer forming surface F, on which the recording layer 14 is formed in a subsequent step. As the method of producing the intermediate layer 15 will be described later in detail, detailed description therefor is omitted here. When the servo signal layer 12 having a refractive index different from that of the recording layer 14 is used, the recording layer forming surface F may be the surface of the servo signal layer 12 and the recording layer 14 may be formed on top of the servo signal layer 12.

Next, as seen in FIG. 8 (*b*), a material for the recording layer 14 is applied to the recording layer forming surface F by spin coating (first step), followed by irradiation with ultraviolet light (light) to completely cure the material for the recording layer 14 (second step).

Next, as seen in FIG. 8 (*c*), a material for the second intermediate layer 15B is applied on top of the recording layer 14 by spin coating (third step). The thickness of the material applied for the second intermediate layer 15B in the third step is thinner than the expected thickness of the finally-obtained second intermediate layer 15B. Thereafter, the material for the second intermediate layer 15B is completely cured by irradiation with ultraviolet light (sixth step).

Thereafter, as seen in FIG. 9 (*a*), the material for the second intermediate layer 15B is then applied again by spin coating on top of the second intermediate layer 15B having been completely cured (seventh step). In this step, in consideration of shrinkage during curing and the like, the material for the second intermediate layer 15B is applied so as to obtain, together with the thickness of the previously-formed second intermediate layer 15B, the expected thickness of the finally-obtained second intermediate layer 15B.

Next, as seen in FIG. 9 (*b*), a material for the first intermediate layer 15A is applied by spin coating before curing the material for the second intermediate layer 15B applied in the previous step (seventh step) or after partially curing the material for the second intermediate layer 15B by a slight amount of ultraviolet light radiation or other means (fourth step). In the fourth step, the material for the first intermediate layer 15A in the form of liquid is adhered on the second intermediate layer 15B which has not been completely cured, so that the material for the second intermediate layer 15B and the material for the first intermediate layer 15A are slightly dispersed and merged with each other.

Thereafter, as seen FIG. 10 (*a*), the material for the second intermediate layer 15B and the material for the first intermediate layer 15A are completely cured by irradiation with ultraviolet light (fifth step). Once the second intermediate layer 15B and the first intermediate layer 15A are cured, the first intermediate layer 15A and the second intermediate layer 15B are fixed to each other with these layers being appropriately merged, and one intermediate layer 15 is formed accordingly. Dispersion of the first intermediate layer 15A and the second intermediate layer 15B does not occur afterwards. Accordingly, a set of layers (composite layer) including the recording layer 14 and the intermediate layer 15 (first intermediate layer 15A and second intermediate layer 15B) is formed.

After that, these steps as described above are repeatedly carried out. To be more specific, as seen in FIG. 10 (*b*), the material for the recording layer 14 is applied by spin coating on top of the uppermost intermediate layer 15 (recording layer forming surface F) (first step). At this time, since the uppermost intermediate layer 15 (first intermediate layer 15A) has been completely cured, even if the material for the recording layer 14 is applied thereon, the recording layer 14 is not merged with the intermediate layer 15 (first intermediate layer 15A) and an interface (far-side interface 18) is clearly formed.

Thereafter, the second step, the third step, the sixth step, the seventh step, the fourth step, and the fifth step as shown in FIGS. 8 (*c*) to 10 (*a*) are carried out in this order. Accordingly, a second composite layer is formed. After that, the aforementioned steps are repeated plural times. Finally, a cover layer 16 is formed on top of the intermediate layer 15 to produce an optical information recording medium 10.

According to the manufacturing method for the optical information recording medium 10 as described in this embodiment, the optical information recording medium 10 is manufactured by repeating the application step and the curing step on a spin coater. In other words, it is possible to manufacture the optical information recording medium 10 at low cost using conventional spin coater equipment.

Further, since the material for the recording layer 14, the material for the first intermediate layer 15A, and the material for the second intermediate layer 15B contain UV curable resin, the recording layer 14, the first intermediate layer 15A, and the second intermediate layer 15B can easily and quickly cured by irradiation with ultraviolet light in the second step shown in FIG. 8 (*b*), in the sixth step shown in FIG. 8 (*c*), and in the fifth step shown in FIG. 10 (*a*).

According to the present invention, the aforementioned sixth and seventh steps can be omitted depending on characteristics of the material for the first intermediate layer 15A and the material for the second intermediate layer 15B to be selected. In this instance, the material for the second intermediate layer 15B is applied on top of the recording layer 14 which has been formed after the first and second steps (third step). In consideration of shrinkage during curing and the like, the material for the second intermediate layer 15B is applied by the amount required for the expected thickness of the finally-obtained second intermediate layer 15B. Thereafter, before curing or after partially curing the second intermediate layer 15B applied in the preceding step (third step), the material for the first intermediate layer 15A is applied (fourth step), followed by curing the first intermediate layer 15A and the second intermediate layer 15B (fifth step).

Although one exemplary embodiment of the present invention has been described above, the present invention is not limited to the above-described embodiment and various changes and modifications may be made where necessary.

Figure 11:
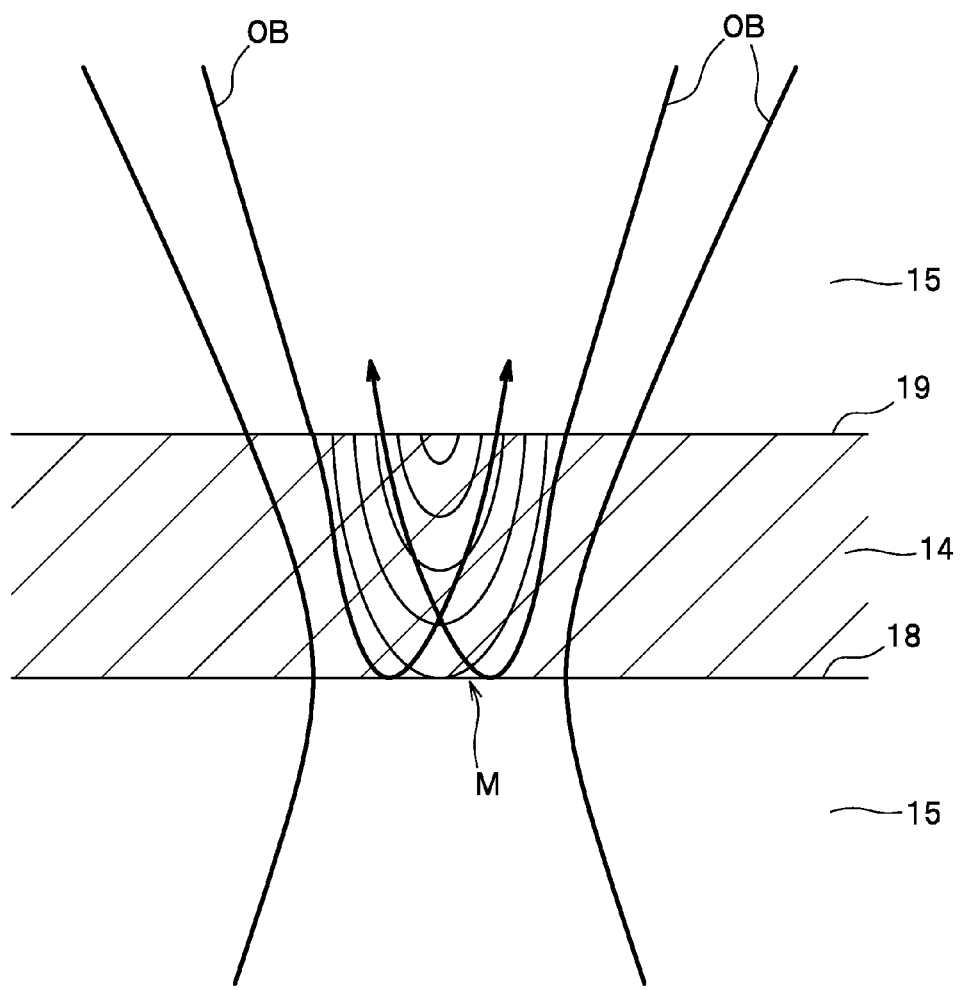
FIG. 11 is an explanatory view of a modified embodiment and showing the lens effect at the time of reading out information.

For example, in the above embodiment, the refractive index of the recording layer 14 decreases by irradiation with the recording beam. However, a recording material which increases the refractive index by irradiation with the recording beam may be used instead. In this instance, as seen in FIG. 11, since the recording spot M acts to collect the reading beam OB, the recorded portion reflects the reading beam OB with a reflectivity higher than that of the non-recorded portion, so that the modulation is generated by the difference in the intensity of the reflected light between the recorded portion and the non-recorded portion. Of course, to increase the degree of modulation to obtain a higher signal-to-noise ratio in the reproduction output, as with the above embodiment, it is preferable that the recording layer 14 contains a recording material which decreases the refractive index by irradiation with the recording beam.

In the above embodiment, the material for the recording layer 14, the material for the first intermediate layer 15A, and the material for the second intermediate layer 15B are applied by spin coating. However, as long as a proper coating film having a desired thickness is obtained, the application method is not limited to the spin coating.

In the above embodiment, the material for the recording layer 14, the material for the first intermediate layer 15A, and the material for the second intermediate layer 15B contain UV curable resin (light curing resin). However, these materials are not limited to this specific embodiment and may not contain any light curing resin.

Further, in the above embodiment, the cover layer 16 is formed on top of the intermediate layer 15. However, the present invention is not limited to this specific embodiment, and the cover layer 16 may be formed on top of the recording layer 14.

What is claimed is:

1. An optical information recording medium comprising:
    a plurality of recording layers, each of which undergoes a change in a refractive index by irradiation with a recording beam; and
    at least one intermediate layer,
    wherein the intermediate layer is a composite layer including a first intermediate layer and a second intermediate layer, and is located between two adjacent recording layers,
    wherein the first intermediate layer is disposed adjacent to one of the two recording layers at a side opposite to an incident side from which a recording beam enters the recording layer, and a refractive index of the first intermediate layer is different from a refractive index of the recording layer both before and after information is recorded in the recording medium,
    wherein the second intermediate layer is disposed adjacent to the other one of the two recording layers at an incident side from which the recording beam enters the recording layer, and a refractive index of the second intermediate layer is substantially the same as that of the recording layer, and
    wherein the first intermediate layer and the second intermediate layer have different refractive indices from each other and are merged with each other at an interface therebetween, whereby a refractive index gradually changes at the interface.

2. The optical information recording medium according to claim 1, wherein the recording layers are made of resin which contains dye, and the first intermediate layer and the second intermediate layer are made of resin which is transparent to the recording beam.

3. The optical information recording medium according to claim 1, which satisfies $0.001 < ((n2-n1)/(n2+n1))^2 < 0.04$, where n1 is the refractive index of the recording layer adjacent to the first intermediate layer, and n2 is the refractive index of the first intermediate layer.

4. A method for manufacturing an optical information recording medium of claim 1 comprising:
    a first step of applying a material for the recording layer to a recording layer forming surface;
    a second step of curing the recording layer;
    a third step of applying a material for the second intermediate layer on top of the recording layer, the material for the second intermediate layer having a refractive index substantially the same as that of the recording layer;
    a fourth step of applying a material for the first intermediate layer before curing or after partially curing the second intermediate layer applied in an immediately preceding step; the material for the first intermediate layer having a refractive index different from the refractive index of the recording layer, and the material for the second intermediate layer and the material for the first intermediate layer being different from each other; and
    a fifth step of curing the first intermediate layer and the second intermediate layer,
    wherein these steps are repeatedly carried out.

5. The method according to claim 4, further comprising:
    a sixth step of curing the second intermediate layer; and
    a seventh step of applying the material for the second intermediate layer on top of the second intermediate layer,
    wherein the sixth and seventh steps are carried out between the third step and the fourth step.

6. The method according to claim 4, wherein application of the material for the recording layer, application of the material for the first intermediate layer, and application of the material for the second intermediate layer are carried out by spin coating.

7. The method according to claim 4, wherein the material for the recording layer, the material for the first intermediate layer, the material for the second intermediate layer contain light curing resin, and wherein the material for the recording layer, the material for the first intermediate layer, and the material for the second intermediate layer are cured in the second step and in the fifth step by irradiation with light.

8. The method according to claim 5, wherein the material for the recording layer, the material for the first intermediate layer, the material for the second intermediate layer contain light curing resin, and wherein the material for the recording layer, the material for the first intermediate layer, and the material for the second intermediate layer are cured in the second step, in the sixth step, and in the fifth step by irradiation with light.

* * * * *